Sept. 26, 1944.　　　　D. PLATKIN　　　　2,358,996
COMBINED TOASTER AND COOKER
Filed June 11, 1941　　　2 Sheets-Sheet 1

DANIEL PLATKIN,
INVENTOR

BY
ATTORNEY.

Sept. 26, 1944.  D. PLATKIN  2,358,996
COMBINED TOASTER AND COOKER
Filed June 11, 1941   2 Sheets-Sheet 2
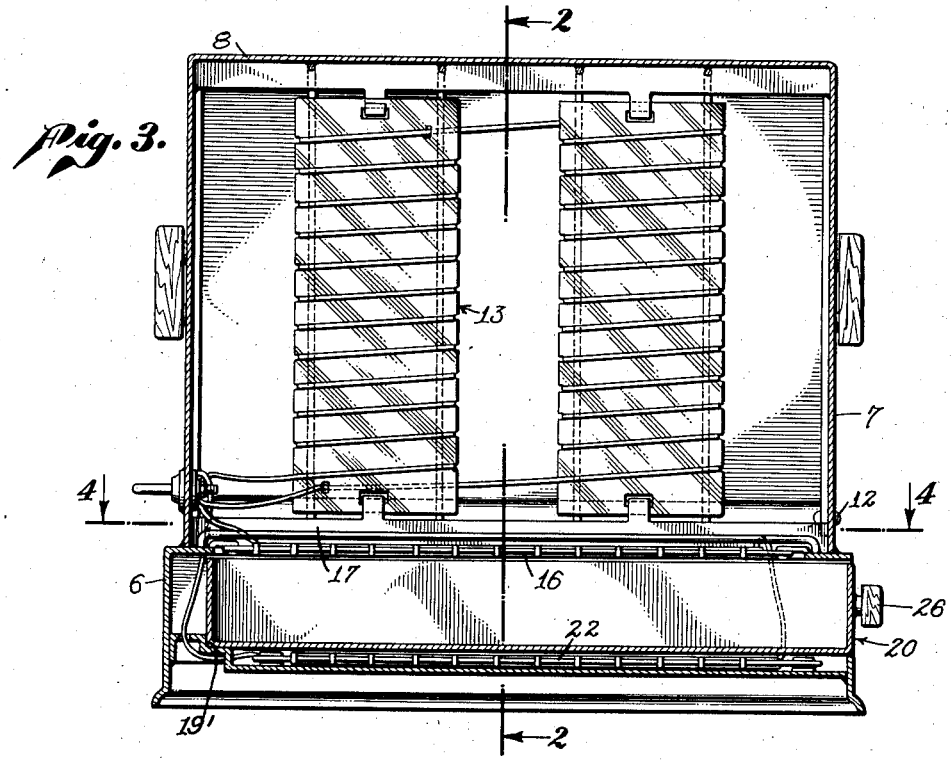
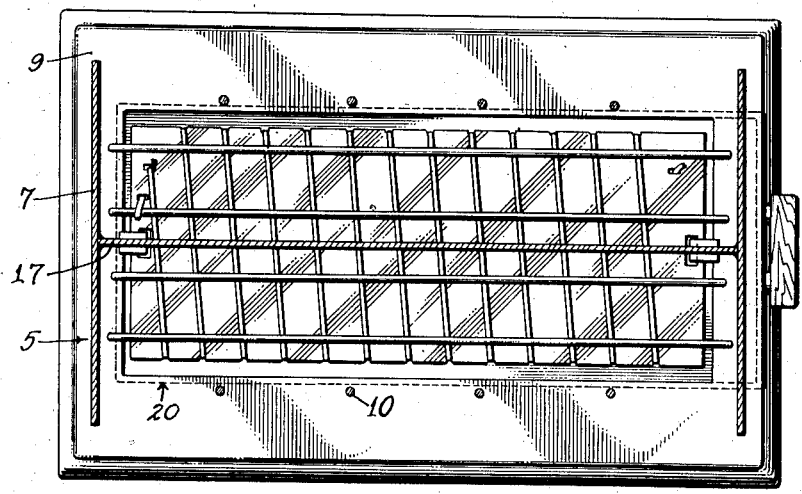
DANIEL PLATKIN,
INVENTOR Patented Sept. 26, 1944

2,358,996

UNITED STATES PATENT OFFICE 2,358,996

COMBINED TOASTER AND COOKER

Daniel Platkin, Los Angeles, Calif.

Application June 11, 1941, Serial No. 397,537

4 Claims. (Cl. 99—339)

An object of my invention is to provide a combined toaster and cooker in which electrical heating elements are so arranged in relation to compartments for toasting bread and cooking other food, that the toasting and cooking may be done simultaneously.

Another object of my invention is to provide a housing for a device of the character described which supports a vertical heating element for toasting bread and the like, and one or more horizontal heating elements for cooking other foods such as bacon, eggs, steaks, chops and the like.

A further object is to provide in a device of the character described a sliding tray or grille in which food may be cooked by application of heat above or below or both, and which tray is slidably mounted on a track or shelf formed within the housing.

A still further object of the invention is to provide in combination with a bread toaster or the like a cooking compartment located within the housing of the device and arranged so that a table or any other support upon which the device is resting is protected from heat generated in the lower heating element of the device, and from food particles, grease, or drippings which may accumulate in the cooking compartment.

These and other objects of my invention will be made more fully apparent from a further consideration of the specification and the drawings.

In the drawings:

Figure 3 is a vertical section of the device taken on the line 3—3 of Figure 2.

Figure 1:
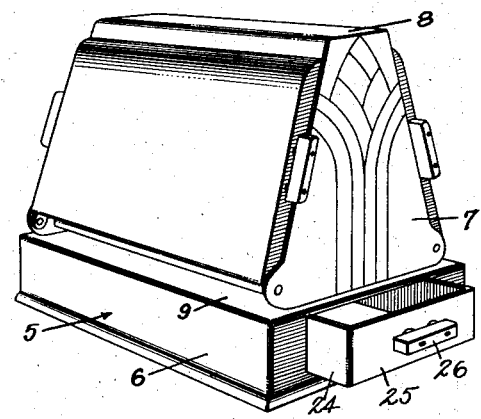
Figure 1 is a perspective view of my combined toaster and cooker with the cooking tray thereof partly withdrawn for purposes of illustration.
Figure 2:
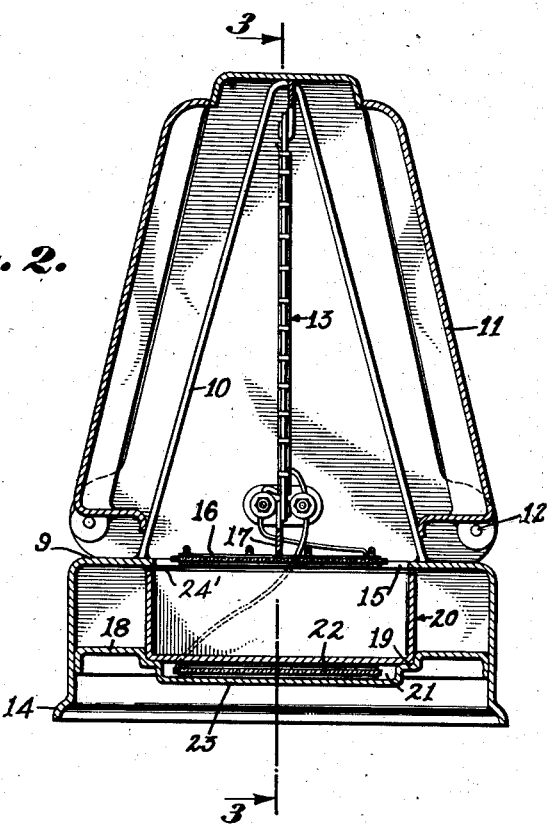
Figure 2 is a vertical sectional view of the same device.

In Figure 3 the line 2—2 represents the section upon which Figure 2 is taken.

Figure 4 is a horizontal sectional view of the device taken on the line 4—4 of Figure 3.

The device comprises a housing 5 having a base portion 6, ends 7, and a top closure 8. The housing may be formed of metal or a heat resistant plastic or glass.

Supported on the upper surface 9 of the base portion 6 is a rack 10 preferably of inverted V configuration against which bread to be toasted may rest. Side plates 11 pivotally mounted on the ends 7 at 12 are provided for confining the bread to be toasted and also conserving the heat originating from toaster burner 13, the latter being vertically disposed by suspension from the top 8.

I preferably provide a bead or flange 14 around the lower edge or base portion of the base 6. The top portion 9 of the base 6 is formed with a rectangular opening 15, disposed within which is a flat horizontal electrical heating element 16 which may be mounted by bracket member 17 at the lower end of the heating element 13, or in any other desired and convenient manner.

Securely mounted within the base 6 and entirely closing off the upper hollow portion of the base 6 from that portion of the base below it, is a horizontal partition 18, which preferably has the configuration illustrated as most clearly seen in Figure 2. This includes an offset portion 19 extending longitudinally of the device and providing a track or shelf for slidably supporting a cooking tray 20. At the rear end of the housing, the offset of the partition 18, indicated at 19', affords a stop to position the tray when pushed all the way into the housing. Below the offset 19, the member 18 is depressed to provide a horizontal chamber 21 in which may be located a flat electrical heating element 22. The member 18, or at least that portion of it indicated at 23 which forms the chamber 21 may be made of material which reflects the heat from the element 22 upwardly, or insulates the heat of said element 22 from the region below the member 18, or performs both functions.

The tray 20 may be made of metal or heat resistant plastic or glass and is preferably rectangular in shape, with sufficient depth provided by the sides and ends 24 and 25 respectively to furnish a cooking receptacle of convenient and useful capacity. I provide a handle or knob 26 at the outer end of the tray 20.

Preferably the upper edges 24' of the sides and ends 25 are closely adjacent to the top 9 of the base portion 6, and lie under the said top and substantially coincide with the opening 15, accomplishing the purposes of concentrating the heat from the heating elements 16 and 22 and also preventing grease and food particles from spattering over into the region between the tray 20 and the sides and ends of the base portion 6.

While I have shown all three electric heating elements 13, 16, and 22, as being in a common circuit, they may be so wired and provided with switches if desired as to be selective for use. I may also eliminate one or the other of the horizontal heating elements 16 and 22, or use them selectively if desired. Thus, the heating element 16 if used alone would cook food contained in the tray 20 as a broiler, whereas the heating element 22 would be used for frying or any other cooking function in which heat is commonly applied below the cooking receptacle. When both elements are used simultaneously the double function is obtained.

Although I have herein shown and described my invention in what I have conceived to be the most practical and preferred embodiment, it is recognized that departures may be made therefrom within the scope of my invention, which is not to be limited to the details disclosed herein but it is to be accorded the full score of the claims so as to embrace any and all equivalent structures.

Having described my invention, what I claim as new and desire to secure by Letters Patent is:

1. A device of the character described comprising a substantially closed housing having an opening in the upper face, and an opening in one vertical wall for the reception of a cooking tray, an open cooking tray adapted to be inserted in said housing through said opening in the wall, the tray being open at the top and directly below the opening in the upper face of the housing whereby heat from the tray will pass by convection and radiation through the last said opening, means for heating the tray positioned in the last said opening and a toasting compartment mounted on said housing directly above the last named opening and open at the bottom for direct communication with the opening in the upper face of the housing, said toasting compartment having heating means therein.

2. A device of the character described comprising a substantially closed housing formed with vertical walls and a horizontal shelf extending entirely across between the walls, said housing having an opening at the top, and an opening in one wall for the reception of a cooking tray, an open top cooking tray adapted to be inserted in said housing through said wall opening and to rest upon said shelf directly below the opening at the top of the housing whereby heat from the tray will pass by convection and radiation through said last named opening, means for heating the tray positioned thereunder, and a toasting compartment mounted on said housing directly above the last named opening and open at the bottom for direct communication with the opening in the upper face of the housing, said toasting compartment having heating means therein.

3. A device of the character described comprising a substantially closed housing formed with vertical walls and a horizontal shelf extending entirely across between the walls, said housing having an opening at the top, and an opening in one wall for the reception of a cooking tray, an open top cooking tray adapted to be inserted in said housing through said wall opening and to rest upon said shelf directly below the opening at the top of the housing whereby heat from the tray will pass by convection and radiation through said last named opening, means for heating the tray positioned above and below said tray, and a toasting compartment mounted on said housing directly above the last named opening and open at the bottom for direct communication with the opening in the upper face of the housing, said shelf having parallel recesses adapted to guide and support the tray, above one of said tray heating means.

4. A device of the character described comprising a substantially closed housing formed with vertical walls and a horizontal shelf extending entirely across between the walls, said housing having an opening at the top, and an opening in one wall for the reception of a cooking tray, an open cooking tray adapted to be inserted in said housing through said wall opening and to rest upon said shelf, the tray being open at the top and of such size relative to the opening at the top of the housing that heat from the tray will pass by convection and radiation through said last named opening, means for heating the tray, and a toasting compartment mounted on said housing directly above the last named opening and open at the bottom for direct communication with the opening in the upper face of the housing, said shelf having a horizontal offset section adapted to contain the said heating means below the tray.

DANIEL PLATKIN.